M. MEYERSON.
MOTOR SLED.
APPLICATION FILED APR. 23, 1910.
977,421.
Patented Nov. 29, 1910.
2 SHEETS—SHEET 1.
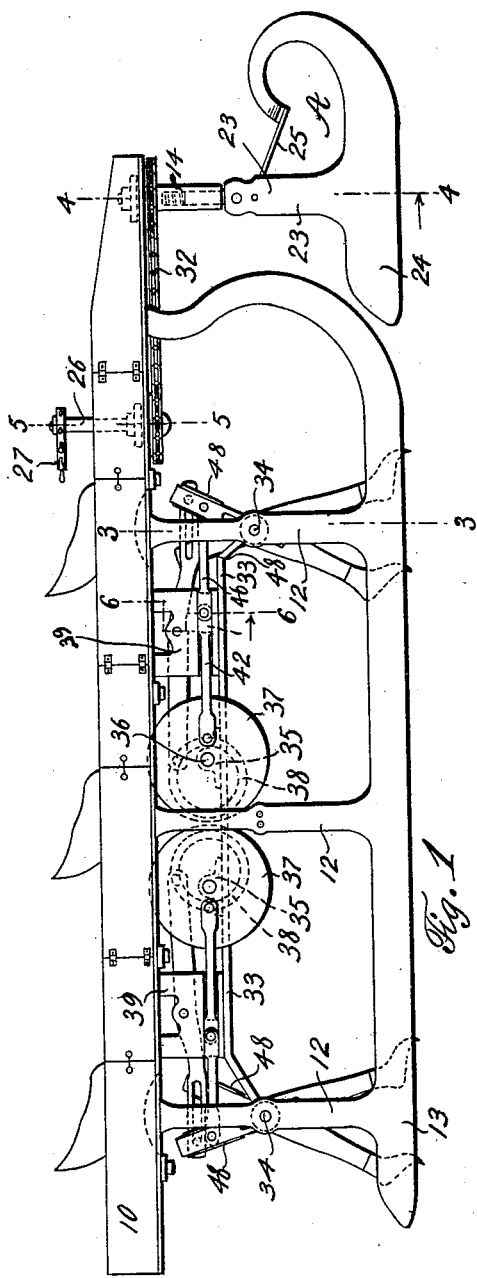
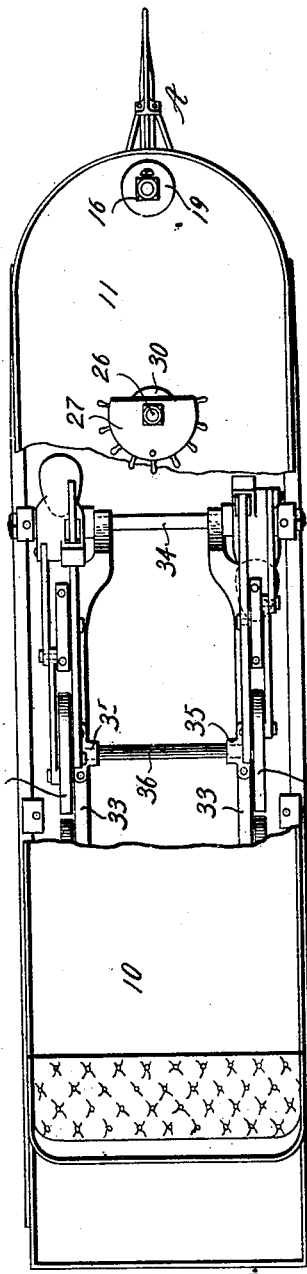

M. MEYERSON.
MOTOR SLED.
APPLICATION FILED APR. 23, 1910.
977,421.
Patented Nov. 29, 1910.
2 SHEETS—SHEET 2.
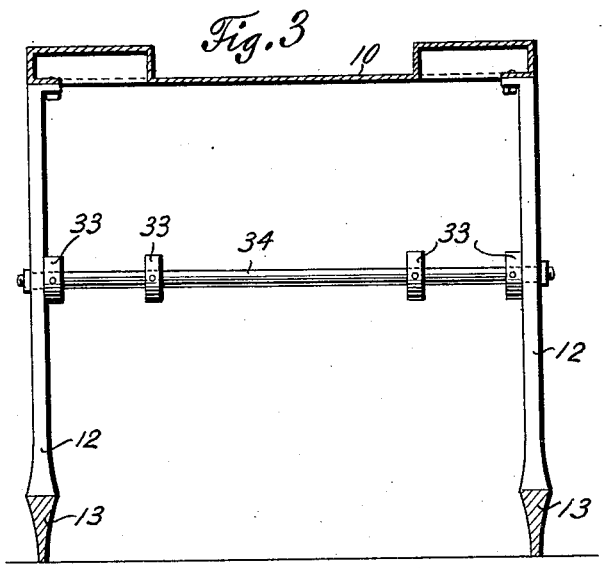
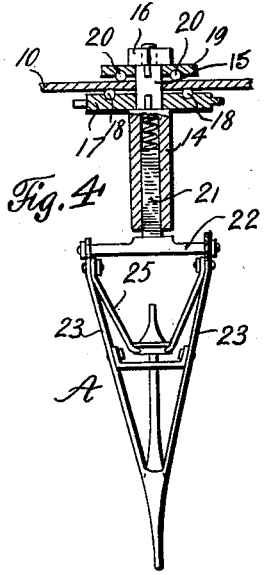
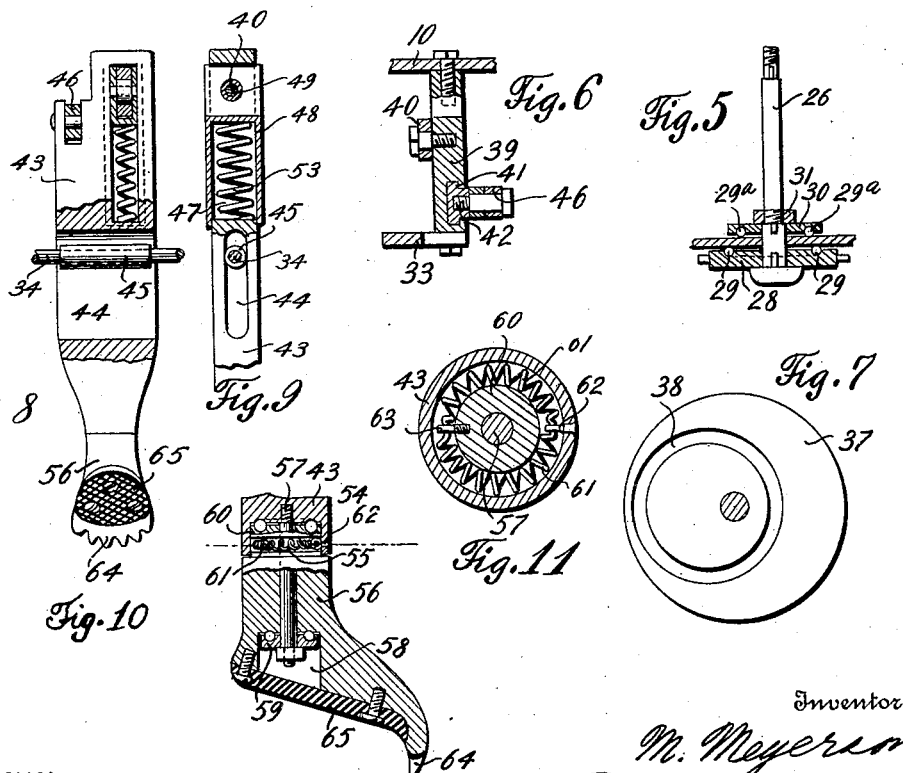
Witnesses
E. Larson
Charles S. Wilson
Inventor
M. Meyerson
By Beeler & Robb
Attorneys

UNITED STATES PATENT OFFICE.

MEYER MEYERSON, OF BENNETVILLE, MINNESOTA, ASSIGNOR OF ONE-HALF TO BERTRAM BAADNES, OF AITKIN, MINNESOTA.

MOTOR-SLED.

977,421.      Specification of Letters Patent.      Patented Nov. 29, 1910.

Application filed April 23, 1910. Serial No. 557,175.

*To all whom it may concern:*

Be it known that I, MEYER MEYERSON, a citizen of the United States, residing at Bennetville, in the county of Aitkin and State of Minnesota, have invented certain new and useful Improvements in Motor-Sleds, of which the following is a specification.

This invention has reference to motor sleds and is designed to construct a vehicle of this nature wherein the propellers are adapted to operate as originally placed when the sled goes around a curve, thus eliminating the liability of breaking said propellers.

A further object is the construction of a steering mechanism which will permit the same to take up all unevenness and irregularity in the ground and which will be centrally disposed with respect to the transverse dimension of the sled.

This invention also contemplates the provision of propellers for a sled of this nature which will operate in such a manner that the force exerted on each runner of the sled will be similar, thus insuring the operation of the sled in a straight line.

With the above and other objects in view, this invention consists in the construction, combination, and arrangement of parts all as hereinafter more fully described, claimed and illustrated in the accompanying drawings, wherein:

Figure 1 is a side elevation of a sled constructed in accordance with the present invention; Fig. 2 is a top plan view, parts thereof being broken away; Fig. 3 is a transverse section taken along line 3—3 of Fig. 1; Fig. 4 is a vertical section taken along line 4—4 of Fig. 1; Fig. 5 is a similar section along line 5—5 of Fig. 1; Fig. 6 is a section taken through one of the brackets along line 6—6 of Fig. 1; Fig. 7 is an inside elevation of one of the cams; Fig. 8 is a rear elevation partly in section of one of the propellers; Fig. 9 is a section taken along line 9—9 of Fig. 8; Fig. 10 is a central vertical section of the foot of one of the propellers; Fig. 11 is a section taken along line 11—11 of Fig. 10.

The present invention resides in the provision of a body having runners disposed on each side thereof, and a forward pivotally carried steering rudder centrally disposed with respect to the transverse dimension of the body. A plurality of propellers are carried by the supports of the body and are adapted to move vertically and oscillate about a pivotal point, thereby imparting motion to the sled. A centrally disposed steering apparatus is pivotally mounted on the forward extremity of the body, and due to the pivotal construction thereof is adapted to conform with all irregularities in the ground so that the rudder is constantly in contact with the ground.

Reference being had more particularly to the drawings 10 indicates the body of a sled, the forward extremity 11 of which is curved, said body portion having along each longitudinal side, the vertical supports 12 to which are connected the V-formed runners 13 which curve upwardly at their forward extremities where they are secured to the body portion 10.

A sleeve 14 is centrally and rotatably mounted in the forward extremity 11 of the body portion through the medium of the shank 15 extending through the bottom, after which it is engaged by the nuts 16. A sprocket wheel 17 is connected to the shank 15 and has the ball bearings 18 interposed between the same and the forward part 11 of the body portion, said sprocket wheel being adapted to rotate the sleeve or socket when so desired. A disk 19 is clamped between the nut 16 and the forward portion 11 and thereby retains the ball bearings 20 in place. Thus, it will be seen that the sleeve 14 will rotate easily when power is applied to the sprocket wheel 17. The rudder indicated as A is rigidly carried in the sleeve 14 through the instrumentality of the shank 21 provided with the transverse bar 22 at its lower extremity, to which is pivoted the converging side braces 23 which are enlarged at their lower terminals to form the runners 24, said runners curving upwardly at their forward terminals and braced by the rods 25 extending from the free terminals thereof to the upper portion of the converging side bars 23. A vertical steering shaft 26 provided at its upper extremity with the semi-circular wheel 27 is mounted adjacent to the forward seat of the body portion, similarly to the sleeve 14, being provided with the sprocket wheel 28 bearing against the ball bearings 29 below the surface of the floor and the disk 30 bearing against the similar ball bearings 29ª by the clamping disk 31. The sprocket wheel 28 is connected to the sprocket gear 17 by the chain 32. Thus upon the rotation of the guiding wheel 27, the rudder A will be shifted as desired, and consequently the course of the sled changed accordingly.

A supporting rod or bar 33 extends from the rear standard 12 to the forward standard and is off-set inwardly at the terminals thereof to engage the shafts 34 interposed between the standards in question. Adjacent to the vertical standard 12, the bars 33 are provided with the registering bearings 35 in which are journaled the parallel transverse shafts 36, at each extremity of which is mounted a disk 37, said disks being provided with cam grooves 38 on the inner faces thereof. These cam grooves are so located on the disks that rods operated by each pair of adjacent disks will reciprocate in opposite directions.

A bracket 39 is secured between the bottom of the body portion 10 and the supporting rods 33 intermediate the shaft 36 and the adjacent extreme standard 12. A lever 40 is pivoted to this bracket and is provided adjacent to the disk with a roller bearing which operates in the groove 38. Thus, a vertical motion will be imparted to the outer terminal of said lever. A longitudinal slot or channel 41 is provided in the outer side of the bracket 39 in which reciprocates the free terminal of a rod 42 connected at one end to the outer side of the disk 37. Thus it will be seen that the rod 42 has a reciprocatory motion upon the rotation of the disk 37.

The propellers 43 are mounted on the shafts 34 between the terminals of the bar 33 and the uprights 12 by the provision of a vertical slot 44 therein, in which operates a roller 45 carried by the shaft. The upper terminal of the propeller 43 is connected to a rod 46 which is in turn pivotally connected to the free terminal of the reciprocating rod 42. Consequently upon the reciprocation of the rod 42, an oscillatory movement will be imparted to the propeller which, as hereinafter more fully described, engages the snow or ice at its lower extremity and forces the sled forwardly. The propeller 32 is also provided with a vertical transverse channel 47 over which reciprocates the sleeve 48 having the free terminal of the rod 40 pivoted in its upper extremity by the pin 49 engaging the slot 50 in said propeller.

In order that the foot of the propeller may be always in contact with the ground, a spring 53 is interposed between the base of the sleeve 48 and the base of the channel 47.

The lower terminal of the propeller 43 is provided with a depression 54 in which is received the shank 55 of the foot 56, said shank comprising a bolt passing vertically through said foot and retaining in a recess 58 in the base of said foot a ball bearing disk 59. The upper terminal 57 is threaded in the base of the depression 54 and secures the ball bearing disk 60 in place. Interposed between the ball bearing disk 60 and the upper portion of the foot 56 are the springs 61, having one of the terminals thereof secured to the eye 62 carried by the propeller 43 while the other terminals encircle the disk 60 and engage the eye 63 carried thereby. Thus it will readily be seen that when the foot engages the ground while the sled is taking a curve, the same will rest in the position in which it engages the ground until it is removed therefrom, after which it will swing to its normal position through the instrumentality of the springs. The foot is provided with a series of teeth 64 along the forward edge thereof, and with a rubber plate extending from the teeth rearwardly, said plate being adapted to pack the snow and form a biting surface for the teeth.

The operation of the device is comparatively simple. The rods 42 and 46 impart an oscillatory motion to the propellers 43 which cause the feet to bite the snow or ice and force the sled forwardly, but upon the recovery of the propeller, the foot is raised from contact with the ground by the lever 40. The propellers carried by the rear shaft 34 operate in opposite directions as do the propellers carried by the forward axle, the diagonally disposed propellers operating in similar directions.

Having thus described my invention, what is claimed as new is:

1. In a motor sled, the combination with a body portion, of runners carried thereby, a plurality of cam grooved disks mounted in said body portions, a plurality of levers operating adjacent each runner, and means whereby each lever may be oscillated about its pivotal point and operated vertically by one of said cam grooved disks, and a foot carried at the bottom of said lever and pivotally connected thereto, adapted to normally operate in the direction in which said sled is operating.

2. A motor sled comprising in combination, a body portion, runners carried by said body portion, propellers adapted to operate adjacent said runners, the lower portions of said propellers being pivotal and adapted to operate in a normally straight direction while the sled is going around a curve, and means whereby the lower portion of said propellers may be returned normally in the direction in which the sled is operating.

3. In a motor sled, the combination with a body portion, of runners carried thereby, shafts interposed between a portion of the supports of said runners, levers pivotally mounted on said shafts adjacent each runner, said levers having their pivotal points mounted in slots therein, a plurality of cam grooved disks mounted on said body portion adjacent to said levers, a double connection between the upper terminal of each lever with the groove of one of said disks, one portion of said connection being adapted to operate said lever vertically, while the opposite connection is adapted to oscillate said lever about its pivotal point, and pivotal feet carried at the lower terminals of said levers.

4. In a motor sled, the combination with a body portion, of runners carried thereby, a series of propelling levers adjacent said runners, and propelling feet carried at the lower terminals of said levers adapted to operate in a normally straight direction as the sled travels about a curve, and return to the direction in which the sled is operating after the same has completed the curve.

5. In a motor sled, the combination with a body portion, of runners carried thereby, a series of propelling levers adjacent said runners, propelling feet carried at the lower terminals of said levers adapted to operate in a normally straight direction as the sled travels about a curve, and return to the direction in which the sled is operating after the same has completed the curve, and means whereby said levers may be given an oscillatory and a vertical movement in opposite directions.

6. In a motor sled, the combination with a body portion, of runners carried thereby, a plurality of levers operating adjacent each of said runners, a cam grooved disk coöperating with each lever, a bracket supported by the body portion adjacent each lever and its coöperating disk, a slide operating in said bracket, one terminal of said slide being connected to said lever and the opposite terminal of said slide being operatively connected to said disk, and means whereby said lever may be given a vertical movement, and means whereby said disk may be rotated.

7. In a motor sled, the combination with a body portion, of runners carried thereby, a plurality of levers operating adjacent each of said runners, a cam grooved disk coöperating with each lever, a bracket supported by the body portion adjacent each lever and its coöperating disk, a slide operating in said bracket, one terminal of said slide being connected to said lever and the opposite terminal of said slide being operatively connected to said disk, means whereby said lever may be given a vertical movement, a lever pivoted to said bracket having a slotted connection at one terminal of said lever and at its opposite terminal being in operative engagement with said disk adapted to supply vertical motion to said lever, and means whereby said disk may be rotated.

8. In a motor sled, the combination with a body portion, of runners carried thereby, a plurality of levers operating adjacent each of said runners, a bracket supported by the body portion adjacent each lever and its coöperating disk, a slide operating in said bracket, one terminal of said slide being connected to said lever and the opposite terminal of said slide being operatively connected to said disk, means whereby said lever may be given a vertical movement, a lever pivoted to said bracket having a slotted connection at one terminal of said lever and at its opposite terminal being in operative engagement with said disk adapted to supply vertical motion to said lever, propeller feet carried at the lower terminals of said levers, and means whereby said disks may be rotated.

9. In a motor sled, the combination with a body portion, of runners carried thereby, a plurality of levers operating adjacent each of said runners, a bracket supported by the body portion adjacent each lever and its coöperating disk, a slide operating in said bracket, one terminal of said slide being connected to said lever and the opposite terminal of said slide being operatively connected to said disk, means whereby said lever may be given a vertical movement, a lever pivoted to said bracket having a slotted connection at one terminal of said lever and at its opposite terminal being in operative engagement with said disk adapted to supply vertical motion to said lever, propeller feet carried at the lower terminals of said levers, means whereby said propeller feet may operate in a normally straight direction as the sled goes around a curve and return to the direction in which the sled travels after the completion of said curve, and means whereby said disk may be rotated.

In testimony whereof I affix my signature in presence of two witnesses.

MEYER MEYERSON.

Witnesses:
PETER LARSON,
R. M. FALCONER.